United States Patent
Reeff

(10) Patent No.: US 11,240,998 B1
(45) Date of Patent: Feb. 8, 2022

(54) LIVE BAIT RIG

(71) Applicant: Curt R. Reeff, Bismarck, ND (US)

(72) Inventor: Curt R. Reeff, Bismarck, ND (US)

(*) Notice: Subject to any disclaimer, the term of this patent is extended or adjusted under 35 U.S.C. 154(b) by 0 days.

(21) Appl. No.: 17/028,098

(22) Filed: Sep. 22, 2020

(51) Int. Cl.
  *A01K 83/06* (2006.01)
  *A01K 91/04* (2006.01)
  *A01K 93/00* (2006.01)

(52) U.S. Cl.
  CPC .............. *A01K 83/06* (2013.01); *A01K 91/04* (2013.01); *A01K 93/00* (2013.01)

(58) Field of Classification Search
  CPC ........ A01K 83/06; A01K 91/04; A01K 93/00; A01K 85/16; A01K 85/14; A01K 85/00; A01K 85/10
  See application file for complete search history.

(56) References Cited

U.S. PATENT DOCUMENTS

| | | | |
|---|---|---|---|
| 2,184,792 A | 12/1939 | Clarke | |
| 2,950,560 A * | 8/1960 | Worden | A01K 85/16 43/42.19 |
| 3,327,423 A * | 6/1967 | Kotis | A01K 83/06 43/44.2 |
| 3,727,339 A | 4/1973 | Le Master | |
| 4,189,860 A | 2/1980 | Ebert | |
| 4,287,679 A | 9/1981 | Klotz | |
| 5,189,825 A | 3/1993 | Stewart | |
| 5,595,013 A | 1/1997 | Dubriske | |
| 5,996,271 A | 12/1999 | Packer | |
| 6,393,757 B2 | 5/2002 | Bomann | |
| 2004/0049969 A1 | 3/2004 | Rudolph | |
| 2006/0117641 A1 | 6/2006 | Kumlin | |
| 2018/0125047 A1 | 5/2018 | Gierl | |

* cited by examiner

*Primary Examiner* — Timothy D Collins
*Assistant Examiner* — Maria E Graber
(74) *Attorney, Agent, or Firm* — Neustel Law Offices

(57) ABSTRACT

A live bait rig for adding motion to live bait as it moves through the water. The live bait rig generally includes a leader with a fixed loop adapted for attachment to a fishing line, the leader also being attached to or including a fishhook. The rig also includes a float on the leader positioned between the fixed loop and the fishhook, the float having a flat front surface toward the fixed loop and a curved rear surface toward the fishhook, and having an opening that extends from the flat front surface to the curved rear surface, wherein the opening is asymmetrically positioned on the float, wherein the leader passes through the opening such that the float is free to rotate on the leader.

12 Claims, 6 Drawing Sheets

LIVE BAIT RIG

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a live bait rig for creating wobble, flash and motion in live fishing bait.

Related Art

Any discussion of the related art throughout the specification should in no way be considered as an admission that such related art is widely known or forms part of common general knowledge in the field.

Foam floats usable for fishing are on the market, and have been for a number of years, but do not provide action or motion of the live bait. In other words, they are not designed to create action and flash for use with live bait, to make live bait more attractive to fish.

SUMMARY

An example embodiment is directed to a live bait rig. The embodiments disclose a multi-directional live bait float with "action" and flash. In use, the live bait rig typically rotates in one direction for three or four rotations, then pauses and changes direction. The live bait rig creates wobble or motion of a live bait as it moves through water, and includes a leader with a fixed loop adapted for attachment to a fishing line, the leader further being attached to a fishhook. The rig also includes a float on the leader positioned between the fixed loop and the fishhook, the float having a flat front surface toward the fixed loop and a curved rear surface toward the fishhook, and having an opening that extends from the flat front surface to the curved rear surface, wherein the opening is asymmetrically positioned on the float, wherein the leader passes through the opening such that the float is free to rotate on the leader.

Any rearward motion of the float along the leader is stopped (directly or indirectly) by the fishhook as the live bait rig is pulled through water by the fishing line such that water flows against the flat front surface of the float. The water flowing against the flat front surface of the float when the live bait rig is pulled through water by the fishing line causes the float to wobble or rotate.

In some example embodiments, the live bait rig may include a first bead with a bead opening, the leader passing through the bead opening, wherein the bead is positioned between the float and the fishhook, such that the float contacts the bead as the live bait rig is pulled through the water by the fishing line. Such embodiments may be used in combination with any additional features described above or herein.

In still other example embodiments, the live bait rig may further include a second bead with a second bead opening, the leader passing through the second bead opening, wherein the second bead is positioned between the float and the fixed loop, such that the float is slidably held on the leader by the first bead and the second bead. Such embodiments may be used in combination with any additional features described above or herein.

In some example embodiments, the live bait rig may include a float, wherein the float comprises a lower portion below the opening and an upper portion above the opening, and the surface area of the flat front surface of the lower portion may be greater than the surface area of the flat front surface of the upper portion. Such embodiments may be used in combination with any additional features described above or herein.

In some example embodiments, the live bait rig may include a second fishhook attached to the first fishhook by a line, wherein motion is created in the first fishhook and the second fishhook when the float wobbles or rotates. Such embodiments may be used in combination with any additional features described above or herein.

There has thus been outlined, rather broadly, some of the embodiments of the live bait rig in order that the detailed description thereof may be better understood, and in order that the present contribution to the art may be better appreciated. There are additional embodiments of the live bait rig that will be described hereinafter and that will form the subject matter of the claims appended hereto. In this respect, before explaining at least one embodiment of the live bait rig in detail, it is to be understood that the live bait rig is not limited in its application to the details of construction or to the arrangements of the components set forth in the following description or illustrated in the drawings. The live bait rig is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
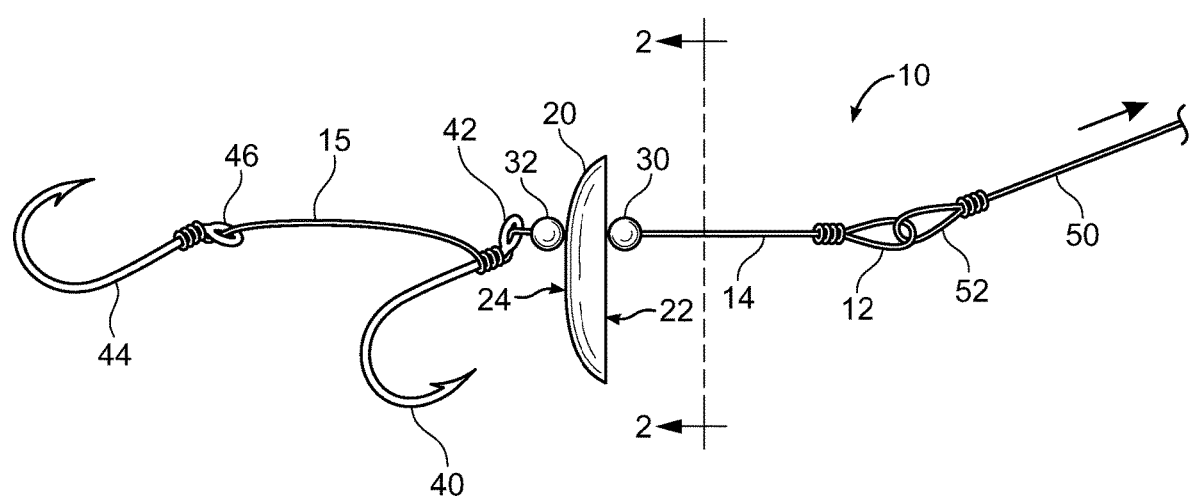
FIG. 1 is a side view of a live bait rig in accordance with an example embodiment.

A. Overview.

An embodiment of live bait rig 10 generally includes a leader 14 with a fixed loop 12 adapted for attachment to a fishing line 50, the leader 14 further being attached to a fishhook 40 using fishhook eye 42. The fishing line 50 may have a loop or snap attachment 52 for releasably attaching the rig 10 to the fishing line 50. The rig 10 also includes a float 20 on the leader 14 positioned between the fixed loop 12 and the fishhook 40, the float 20 having a flat front surface 22 toward the fixed loop 12 and a curved rear surface 24 toward the fishhook 40. The float 20 also has an opening 21 that extends from the flat front surface 22 to the curved rear surface 24, wherein the opening 21 is asymmetrically positioned on the float 20. Typically, the leader 14 passes through the opening 21 such that the float 20 is free to rotate on the leader 14.

The float 20 may comprise a lower portion 26 below the opening 21 and an upper portion 28 above the opening 21, and the surface area of the flat front surface 22 of the lower portion 26 may be greater than the surface area of the flat front surface 22 of the upper portion 28.

Any rearward motion of the float 20 along the leader is stopped (directly or indirectly) by the fishhook 40 as the live bait rig 10 is pulled through water by the fishing line 50 such that water flows against the flat front surface 22 of the float 20. The water flowing against the flat front surface 22 of the float 20 when the live bait rig 10 is pulled through water by the fishing line 50 causes the float 20 to wobble or rotate.

The live bait rig 10 may include a first bead 32 with a bead opening 33, the leader 14 passing through the bead opening 33, wherein the bead 32 is positioned between the float 20 and the fishhook 40, such that the float 20 contacts the bead 32 as the live bait rig 10 is pulled through the water by the fishing line 50.

The live bait rig 10 may further include a second bead 30 with a second bead opening 31, the leader 14 passing through the second bead opening 31, wherein the second bead 30 is positioned between the float 20 and the fixed loop, such that the float 20 is slidably held on the leader 14 by the first bead 32 and the second bead 30.

In some embodiments, the live bait rig 10 may include a second fishhook 44 attached to the first fishhook 40 by a line 15, which may be, for example, tied to fishhook eye 46 of the second fishhook. When the rig 10 is used by pulling the rig through the water, motion is created in the first fishhook 40 and the second fishhook 44 when the float 20 wobbles or rotates due to water drag.

B. Float.

Figure 2:
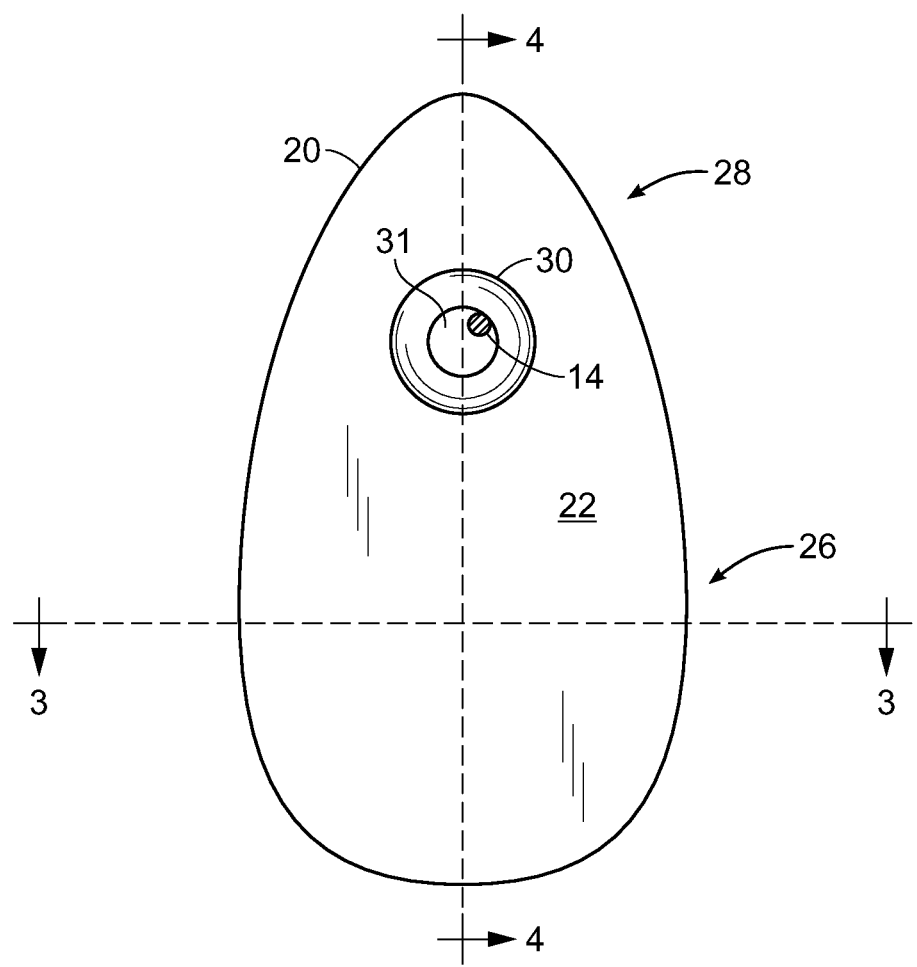
FIG. 2 is a front view of a portion of a live bait rig in accordance with an example embodiment.
Figure 3:
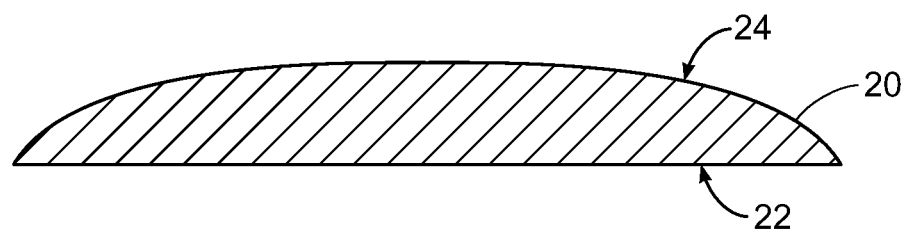
FIG. 3 is a section view of a float usable with live bait rig in accordance with an example embodiment, taken at line 3-3 of FIG. 2.
Figure 4:
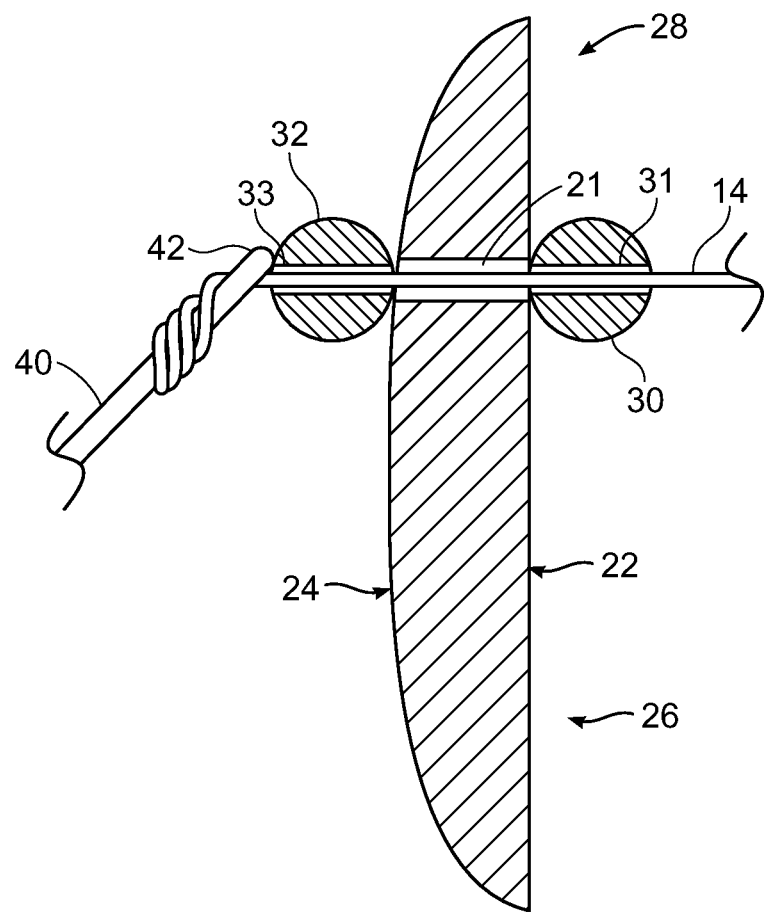
FIG. 4 is a section view of a live bait rig in accordance with an example embodiment, taken at line 4-4 of FIG. 2.

As shown in FIGS. 1-6, the live bait rig 10 includes a float 20 that is designed to be pulled through the water such that the water acting on the flat front surface 22 and the curved rear surface 24 create drag forces that result in wobble or rotation of the float 20, and also motion on one or more fishhooks such as 40 and 44 (which may comprise a crawler harness) that are part of the live bait rig 10. As best shown in FIGS. 3 and 4, the curved rear surface 24 tapers to the position where it meets the flat front surface 22, which contributes to the forces exerted on the float 20 by the water, and allows for lower resistance to rotation or wobble of the float 20.

As perhaps best shown in FIGS. 2-4, the float includes an opening 21 through which leader 14 passes. The opening 21 is located asymmetrically on the float 20, the float 20 having a lower portion 26 below the opening 21, and also having an upper portion 28. As shown, the lower portion 26 is generally larger and also heavier than the upper portion 28. As best shown in FIGS. 2 and 4, the surface area of the generally flat front surface 22 of the lower portion 26 is greater than the surface area of surface 22 of the upper portion 28 of the float, which is above opening 21. Further, it can be seen (especially in FIG. 4) that more of the float's mass is concentrated below the opening 21, which tends to maintain the float's orientation in the position shown, although of course when the rig 10 is being pulled through the water, the float wobbles and rotates away from this position, as shown by position 60 in FIG. 6.

As mentioned, and as shown best in FIGS. 1 and 4-6, the leader 14 of the live bait rig 10 passes through the opening 21 of float 20. The front end of the leader 14 can include a fixed loop 12 for attachment to a line loop 52 or other attachment (such as a snap swivel), on fishing line 50. The other end of the leader 14, spaced apart from fixed loop 12, can be tied or otherwise attached to the first fishhook 40. On either side of float 20, there may be a first bead 32 and a second bead 30. The first bead 32 has an opening 33 which the leader 14 also passes through, and similarly, the second bead 30 has an opening 21 which the leader passes through. The beads may protect the float 20 from being damaged by the leader, the fishing line 50, or by parts of the fishhooks, such as the fishhook eye 42 of fishhook 40. The beads may be threaded onto the leader 14 so that they slide freely on it, or they may be secured to it such that their motion along the leader is more limited.

Figure 5:
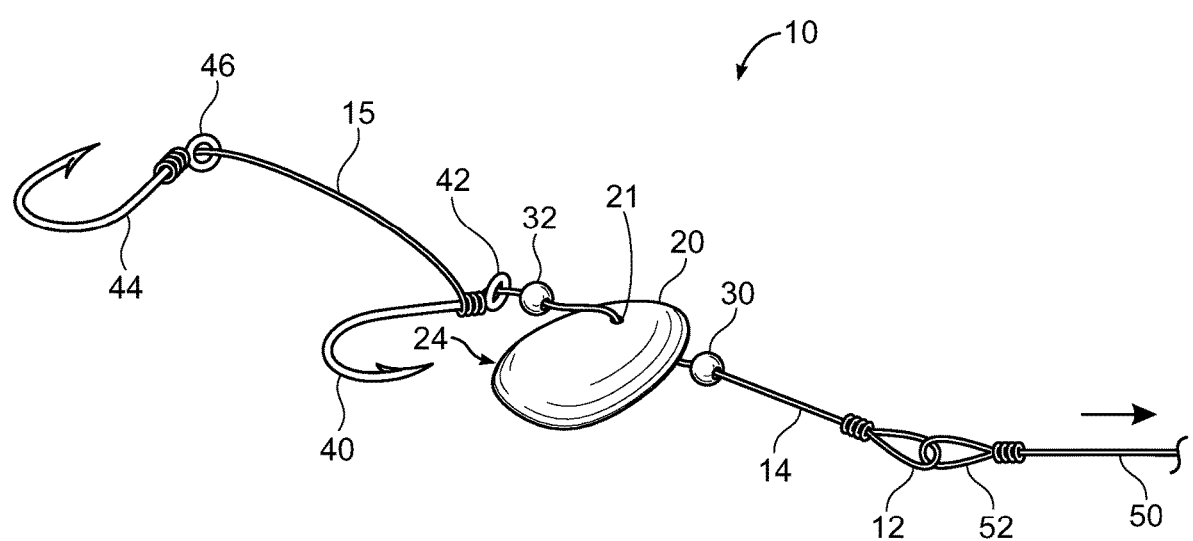
FIG. 5 is a perspective view of a live bait rig in accordance with an example embodiment.
Figure 6:
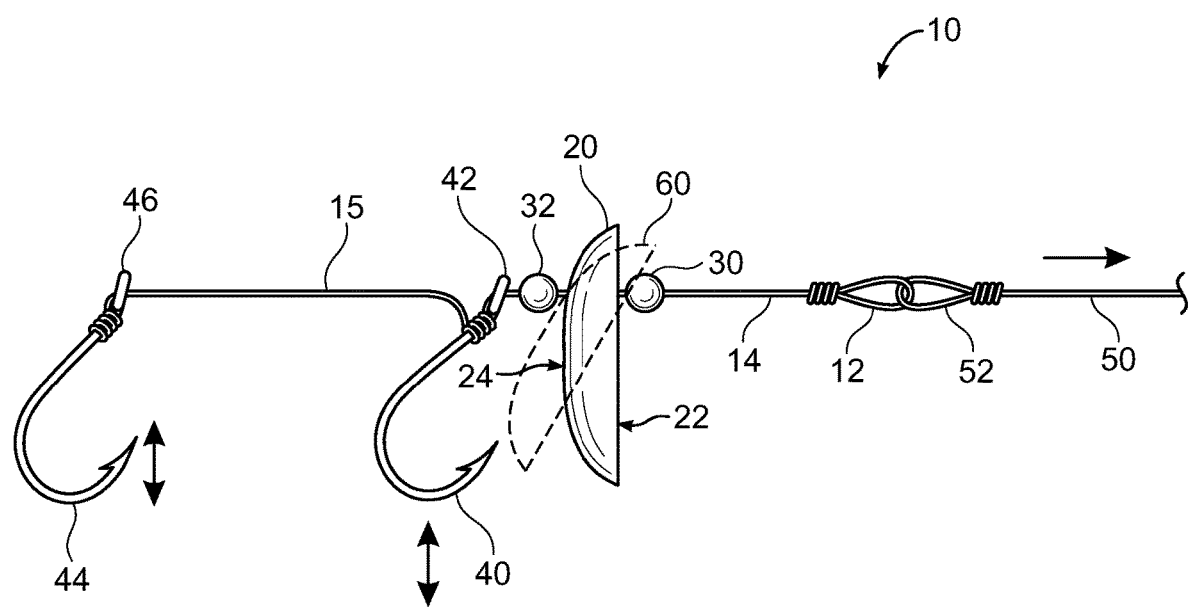
FIG. 6 is another side view of a live bait rig in accordance with an example embodiment.

In addition to a single fishhook 40, the live bait rig 10 may include a second fishhook 44, typically connected to the first fishhook 40 by line 15, so that larger bait items may be used with the live bait rig 10, as shown in FIGS. 1, 5, and 6. This "harness" may be formed by the leader passing through the float 20 and beads 30, 32, being tied to fishhook eye 42 of fishhook 40, then being tied to fishhook eye 46 of fishhook 44. The noted lines may thus be formed from one continuous line, wire, etc., or may be made from separate lines or pieces tied at appropriate places, such as the fishhook eyes 42 and 46.

C. Operation of Preferred Embodiment.

In use, the live bait rig 10 is pulled or retrieved by a user reeling in a fishing line 50 or trolling. In doing so, the live bait rig 10 is retrieved or pulled through the water in the direction indicated by the arrow in FIGS. 1, 5, and 6. As the live bait rig 10 moves through the water, the water presents resistance to the live bait rig, and especially to the flat front surface 22 of float 20.

Any rearward motion of the float 20 along the leader 14 is stopped (directly or indirectly) by the first fishhook 40 as the live bait rig 10 is pulled through the water by the fishing line 50 such that water flows against the flat front surface of the float, as best shown in FIG. 4. The water flowing against the flat front surface 22 of the float 20 when the live bait rig 10 is pulled through water by the fishing line 50 causes the float 20 to wobble or rotate.

The water resistance against the flat front surface 22 of float 20 generally results in unpredictable, multi-directional motion, such as wobble or rotation, which is transferred to the live bait (not shown) on fishhooks 40 and 44, since the fishhooks are attached to the same leader as float 20. Thus, the live bait rig 10 adds "action" and flash to live bait on the live bait rig 10.

In FIG. 6, a displaced alternate position of float 20 is shown, represented by reference numeral 60. This represents a transient position, which is in practice irregular, as mentioned above. When the live bait rig 10 is retrieved or moved through the water, the live bait rig 10 will wobble, and will generally rotate in one direction for three or four rotations, pause, and change direction of rotation. The float 20 is designed to freely rotate about leader 14, which passes through the opening 21.

As shown generally in the figures, the live bait rig 10 can include a fixed loop 12 for attachment to a fishing line 50, such as by a loop 52 (a snap swivel may also be used). The float 20 may be a foam float, and beads 30, 32 may be made of a harder material to protect and float 20 from damage, especially from the line of leader 14, or knots that may damage the float 20 at opening 21.

Unless otherwise defined, all technical and scientific terms used herein have the same meaning as commonly understood by one of ordinary skill in the art to which this invention belongs. Although methods and materials similar to or equivalent to those described herein can be used in the practice or testing of the live bait rig, suitable methods and materials are described above. All publications, patent applications, patents, and other references mentioned herein are incorporated by reference in their entirety to the extent allowed by applicable law and regulations. The live bait rig 10 may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A live bait rig that creates wobble or motion of a live bait as it moves through water, comprising:
    a leader with a fixed loop adapted for attachment to a fishing line, the leader further being attached to a fishhook;
    a float on the leader positioned between the fixed loop and the fishhook, the float having a flat front surface toward the fixed loop and a curved rear surface toward the fishhook, and having an opening that extends from the flat front surface to the curved rear surface, wherein the curved rear surface tapers to a position where it meets the flat front surface at a periphery of the flat front surface, wherein the opening is asymmetrically positioned on the flat front surface, and wherein the leader passes through the opening such that the float is free to rotate on the leader;
    wherein a motion of the float along the leader is stopped by the fishhook as the live bait rig is pulled through water by the fishing line such that water flows against the flat front surface of the float; and
    wherein water flowing against the flat front surface of the float when the live bait rig is pulled through water by the fishing line causes the float to rotate first in one direction and then in an opposite direction;
    wherein the float also wobbles when it rotates.

2. The live bait rig of claim 1, further comprising a bead with a bead opening, the leader passing through the bead opening, wherein the bead is positioned between the float and the fishhook, such that the float contacts the bead as the live bait rig is pulled through water by the fishing line.

3. The live bait rig of claim 2, wherein the bead comprises a first bead, the live bait rig further comprising a second bead with a second bead opening, the leader passing through the second bead opening, wherein the second bead is positioned between the float and the fixed loop, such that the float is slidably held on the leader by the first bead and the second bead.

4. The live bait rig of claim 1, wherein the float comprises a lower portion below the opening and an upper portion above the opening, and wherein the surface area of the flat front surface of the lower portion is greater than the surface area of the flat front surface of the upper portion.

5. The live bait rig of claim 4, further comprising a bead with a bead opening, the leader passing through the bead opening, wherein the bead is positioned between the float and the fishhook, such that the float contacts the bead as the live bait rig is pulled through water by the fishing line.

6. The live bait rig of claim 5, wherein the bead comprises a first bead, the live bait rig further comprising a second bead with a second bead opening, the leader passing through the second bead opening, wherein the second bead is positioned between the float and the fixed loop such that the float is slidably held on the leader by the first bead and the second bead.

7. The live bait rig of claim 1, wherein the fishhook comprises a first fishhook, the live bait rig further comprising a second fishhook attached to the first fishhook by a line, wherein a movement is created in the first fishhook and the second fishhook when the float wobbles and rotates.

8. The live bait rig of claim 7, wherein the float comprises a lower portion below the opening and an upper portion above the opening, and wherein the surface area of the flat front surface of the lower portion is greater than the surface area of the flat front surface of the upper portion.

9. The live bait rig of claim 7, further comprising a bead with a bead opening, the leader passing through the bead opening, wherein the bead is positioned between the float and the fishhook, such that the float contacts the bead as the live bait rig is pulled through water by the fishing line.

10. The live bait rig of claim 9, wherein the bead comprises a first bead, the live bait rig further comprising a second bead with a second bead opening, the leader passing through the second bead opening, wherein the second bead is positioned between the float and the fixed loop, such that the float is slidably held on the leader by the first bead and the second bead.

11. The live bait rig of claim 1, wherein rotation of the float pauses between changes in direction.

12. A live bait rig that creates wobble or motion of a live bait as it moves through water, comprising:
    a leader with a fixed loop adapted for attachment to a fishing line, the leader further being attached to a first fishhook;
    a float on the leader positioned between the fixed loop and the first fishhook, the float having a flat front surface toward the fixed loop and a curved rear surface toward the first fishhook, and having an opening that extends from the flat front surface to the curved rear surface, wherein the curved rear surface tapers to a position where it meets the flat front surface at a periphery of the flat front surface, wherein the opening is asymmetrically positioned on the flat front surface, and wherein the leader passes through the opening such that the float is free to rotate on the leader;
    wherein the float comprises a lower portion below the opening and an upper portion above the opening, and wherein the surface area of the flat front surface of the lower portion is greater than the surface area of the flat front surface of the upper portion;
    a first bead with a first bead opening, the leader passing through the first bead opening, wherein the first bead is positioned between the float and the first fishhook, such that the float contacts the first bead as the live bait rig is pulled through water by the fishing line;
    a second bead with a second bead opening, the leader passing through the second bead opening, wherein the second bead is positioned between the float and the fixed loop, such that the float is slidably held on the leader by the first bead and the second bead; and
    a second fishhook attached to the first fishhook by a line;
    wherein a motion of the float along the leader is stopped by the first bead as the live bait rig is pulled through water by the fishing line such that water flows against the flat front surface of the float;

wherein water flowing against the flat front surface of the float when the live bait rig is pulled through water by the fishing line causes the float to rotate first in one direction, pause, and then rotate in an opposite direction;

wherein the float also wobbles when it rotates; and wherein a movement is created in the first fishhook and the second fishhook when the float wobbles and rotates.

* * * * *